United States Patent [19]

Hubred et al.

[11] 4,432,953

[45] Feb. 21, 1984

[54] LEACHING COBALT FROM SPENT HYDROPROCESSING CATALYSTS WITH SULFUR DIOXIDE

[75] Inventors: Gale L. Hubred, Richmond; Dean A. Van Leirsburg, Petaluma, both of Calif.

[73] Assignee: Chevron Research Company, San Francisco, Calif.

[21] Appl. No.: 422,813

[22] Filed: Sep. 24, 1982

[51] Int. Cl.³ .................................... C01G 51/00
[52] U.S. Cl. .................................. 423/140; 423/53; 423/55; 423/62; 423/68; 423/143
[58] Field of Search .................. 423/53, 150, 55, 62, 423/68, 140, 143

[56] References Cited

U.S. PATENT DOCUMENTS

| | | | |
|---|---|---|---|
| 2,928,732 | 3/1960 | Bare et al. | 75/103 |
| 3,567,433 | 3/1971 | Gutnikov | 423/68 |
| 3,848,054 | 11/1974 | Wienwiowski | 423/140 |
| 3,911,076 | 10/1975 | Probert et al. | 423/53 |
| 4,066,733 | 1/1978 | Dubeck et al. | 423/53 |
| 4,289,605 | 9/1981 | Bartholic | 423/150 |

Primary Examiner—Herbert T. Carter
Attorney, Agent, or Firm—D. A. Newell; S. R. La Paglia; V. J. Cavalieri

[57] ABSTRACT

A process for enhancing recovery of cobalt from spent hydroprocessing catalysts when the spent catalyst particles are first roasted at between 400° C. and 600° C. and then contacted with a first aqueous solution of ammonia and an ammonium salt to recover nickel, cobalt, molybdenum and vanadium. The once-leached spent hydroprocessing catalysts are contacted with a second aqueous solution of sulfur dioxide. The metal values are precipitated with hydrogen sulfide and the precipitate is roasted with unroasted spent hydroprocessing catalysts.

6 Claims, 2 Drawing Figures

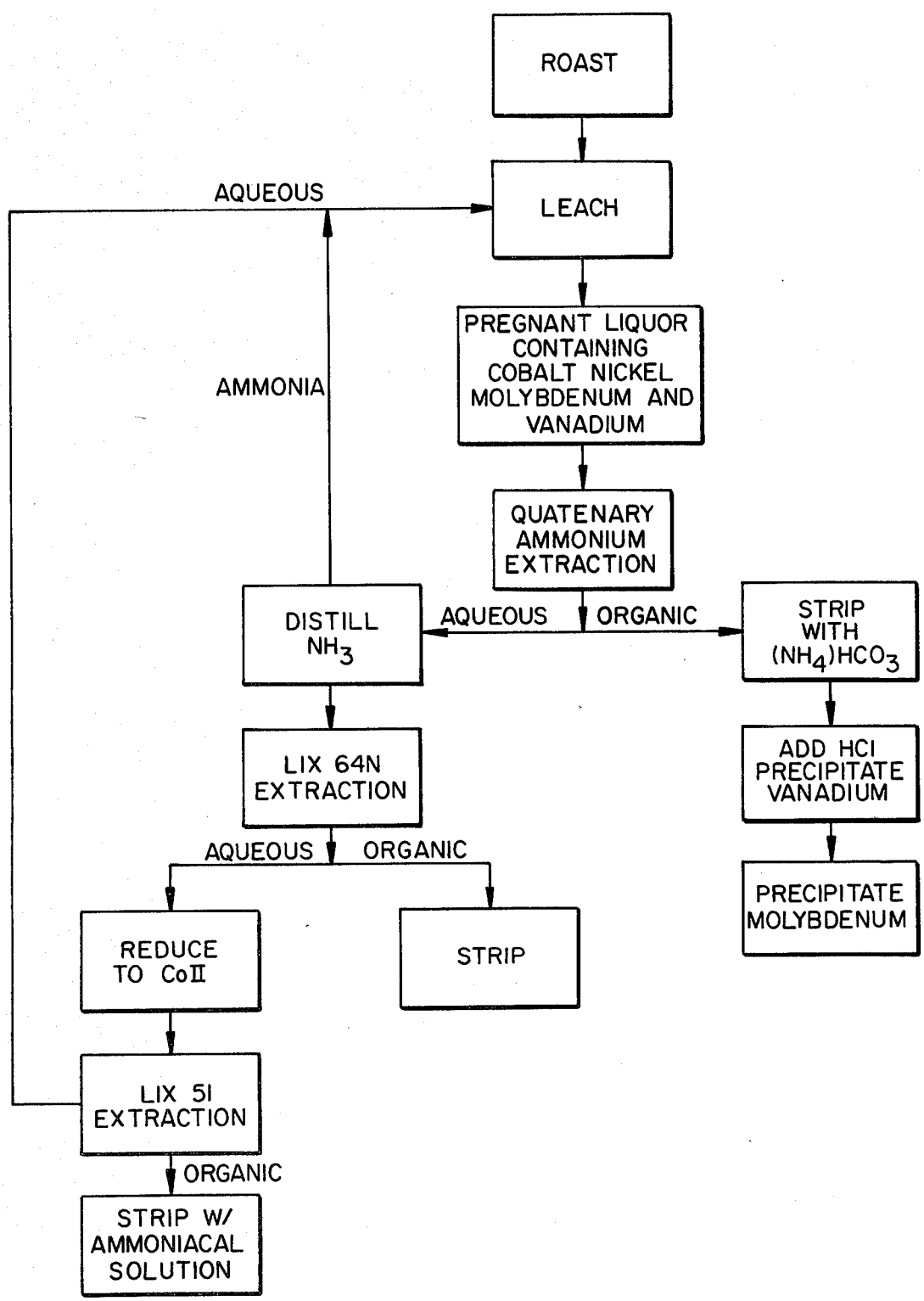
FIG._1.

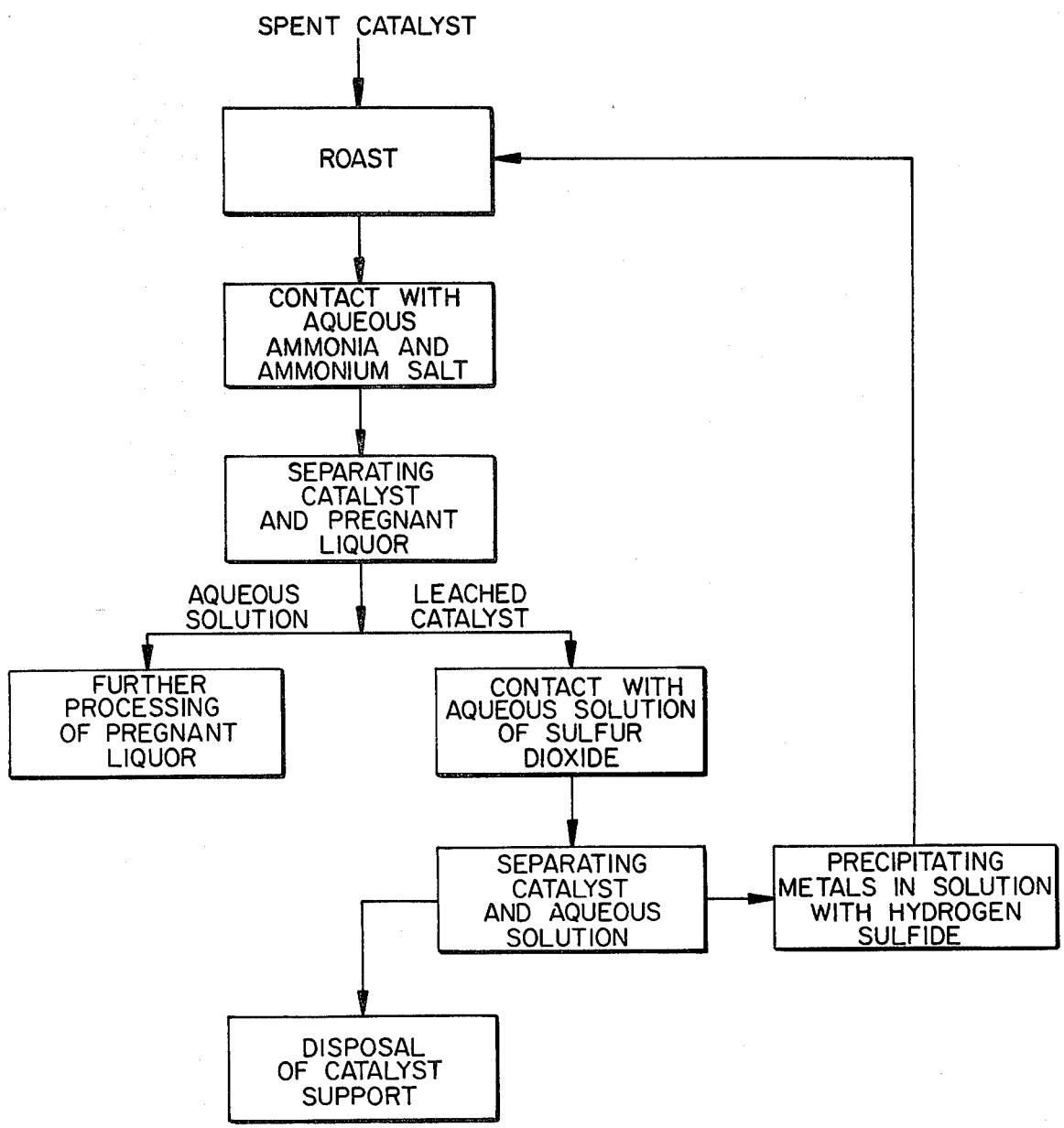
FIG._2.

LEACHING COBALT FROM SPENT HYDROPROCESSING CATALYSTS WITH SULFUR DIOXIDE

BACKGROUND OF THE INVENTION

This invention relates to methods of leaching metals from spent hydroprocessing catalysts, particularly methods of enhancing cobalt recovery from spent hydroprocessing catalysts by the use of sulfur dioxide leaching.

One modern development in crude oil processing is the upgrading of metal and sulfur containing feedstocks, e.g, crude oils and residua by hydroprocessing methods. Such upgrading is necessary to convert the heavy feedstock into more valuable, lower boiling fractions and to remove contaminants, particularly metals and sulfur, that can pollute the atmosphere upon combustion.

Crude oils contain various dissolved contaminants, including nickel, vanadium, iron, and sulfur. The lighter fractions are frequently distilled off under atmospheric pressure or a partial vacuum leaving the metals in a high boiling fraction generally called the "residual fraction," or "residua." Residua will generally contain at least 35 ppm metal contaminants, frequently as high as 100 ppm, and in extreme cases, higher than 1000 ppm.

These metals and any sulfur present are removed, thereby upgrading the feedstock, by processing the feedstock, with a catalyst, in the presence of hydrogen. Such catalysts are generally a solid support that contains catalytic metals, generally either molybdenum or tungsten with either nickel or cobalt. As the catalyst is used, metals from the feedstock deposit on its exterior surface and the interior surface of its pores, eventually plugging the pores and reducing the activity of the catalyst to such an extent it does not give the desired product quality. Such catalysts are herein defined as "spent catalysts," and contain catalytic metals, an inorganic support matrix, metals removed from the feedstock, sulfur compounds, and a hydrocarbonaceous residuum.

Recently, the obtainable crude oil is tending to be heavier, forcing refiners to use more hydroprocessing catalysts than heretofore necessary to remove metals and sulfur from the feedstock. A shortage of the valuable catalytic metals, particularly cobalt, is therefore possible. In an effort to recycle both the catalytic metals and the catalyst supports, providing a renewable source of catalytic metals, efforts have been made to extract metals from hydroprocessing catalysts, particularly hydrodesulfurization and hydrodemetalation catalysts.

One general method of leaching hydroprocessing catalysts is disclosed in U.S. Pat. No. 3,567,433. An aqueous ammonia and ammonium salt leach solution is contacted with spent catalyst particles. The conditions of the system were not optimized, resulting in low metals recovery.

Another leaching process is disclosed in *Chemical Abstracts*, 94:178649x. A spent catalyst, containing aluminum, vanadium, nickel, cobalt, and molybdenum, was leached with ammonia and ammonium salts, at a temperature greater than 110° C. and an oxygen partial pressure of greater than 1 kg/cm$^2$, for more than ½ hour.

Other methods of recovering metals from spent demetalation or desulfurization catalysts are known. U.S. Pat. No. 4,216,118 discloses chlorinating spent catalysts to convert vanadium values to vanadium tetrachloride and nickel values to nickel chloride for recovery by solvent extraction. U.S. Pat. No. 4,145,397 discloses recovery of metals from spent catalysts by roasting at high temperatures and leaching with caustic alkali.

An article in *Engineering and Mining Journal,* May 1978, page 105, describes a plant to process spent catalysts containing no cobalt by first leaching with sodium hydroxide and then with ammonium carbonate.

Cobalt is a particularly difficult metal to remove from hydroprocessing catalysts by conventional aqueous leaching techniques. Under optimum leaching conditions, an aqueous leach solution of ammonia and an ammonium salt rarely removes more than about 50 percent of the cobalt present on the spent catalyst. It has been discovered that if the spent catalysts are leached by a first aqueous solution of ammonia and ammonium salt and subsequently leached by a second aqueous solution having sulfur dioxide dissolved therein, total recovery of cobalt can be well over 90 percent of the metal present on the initial spent catalyst.

SUMMARY OF THE INVENTION

A method is provided for leaching spent hydroprocessing catalyst particles containing carbonaceous and sulfurous residua. The particles are first roasted in an atmosphere containing molecular oxygen at a temperature in the range of between 400° C. and 600° C. The particles are then leached with a first aqueous solution containing ammonia and an ammonium salt in the presence of an oxidizing gas. The liquid is separated from the catalyst which is then leached with a second aqueous solution containing sulfur dioxide. The twice-leached catalyst is separated from the pregnant liquor and the metals therein are precipitated by addition of hydrogen sulfide. The precipitate is then added to un-roasted spent catalyst, roasted, and leached with the spent newly roasted catalyst in aqueous ammoniacal solution. By this method, substantially all the cobalt present can be recovered.

DETAILED DESCRIPTION OF THE PREFERRED EMBODIMENTS OF THE INVENTION

Metals deposited on hydroprocessing catalysts, and in particular the combination of nickel, cobalt, molybdenum and vanadium, can all be removed simultaneously from spent hydroprocessing catalysts by the use of an aqueous leach solution of ammonia and an ammonium salt. Spent hydroprocessing catalysts can be regarded as a high grade ore that contains a peculiar metals composition. Leaching is the method of choice for metals removal from this particular ore since the supports are porous and the metals individually are all known to be leachable; however, to simplify downstream separation of the metals and allow maximum recovery of the inorganic support matrix intact, the leaching conditions chosen should not allow iron, a frequent contaminant of oil, or the inorganic support to be leached.

One of the more valuable metals in spent catalyst is cobalt. Typically, less than 50 percent of the cobalt on the catalyst is leached with an aqueous solution of ammonia. It has been found that by contacting the once-leached catalyst from an ammonia leach with a second aqueous leach having sulfur dioxide (SO$_2$) dissolved therein, it is possible to recover greater than 80% of the total initial amount of cobalt present on the unroasted spent catalyst.

To simplify downstream processing, it is preferable to process one aqueous metals-containing stream. The best choice, for processing, is an aqueous ammoniacal stream. To place the metals leached by the aqueous $SO_2$ solution into the ammoniacal solution, the metals are precipitated as sulfides. The metal sulfides so recovered are mixed with unroasted spent catalyst and re-roasted and releached with the first aqueous ammoniacal solution. The first pregnant liquor, the metals-containing product of the first aqueous solution, therefore will have an equilibrium value of cobalt greater than that if the feed were only spent catalysts.

The spent catalyst, as it comes from the catalytic reaction vessel, is highly contaminated with carbonaceous deposits, also termed "coke," and sulfur. These contaminants are easily removed by combustion in an atmosphere containing molecular oxygen, for example, air, but it has been found that the amount of metals leached from the catalyst particles, particularly nickel, tends to suffer if the catalyst is roasted at too high a temperature. Preferable conditions for reaction with oxygen are at less than 600° C., preferably between 400° C. and 500° C. Temperature can be controlled by diluting the oxygen with nitrogen or by other methods known to the art. The catalyst so treated is free from substantial carbonaceous residue and the metals contained therein can be easily removed by a first aqueous leach. The first aqueous leach solution is a solution of ammonia and an ammonium salt. Such a solution will be alkaline, which is preferred to solubilize vanadium and molybdenum, and will contain free ammonia, an effective complexing agent for nickel and cobalt. Ammonia and ammonium carbonate solutions are especially well suited as they allow reagent recycle by means of distillation of the pregnant liquor and reabsorbtion in fresh or recycle aqueous solution. Ammonium sulfate is another preferred ammonium salt for the practice of this invention. Nickel and cobalt will be free cations and form ammine complexes, and molybdenum and vanadium will be in the form of anionic oxide ions and will form ammonium salts.

The catalyst support of the spent catalyst particles will frequently be alumina. However, mixtures of alumina with other refractory inorganic oxides, for example, silica, boria, magnesia and titania, as well as supports that contain naturally occurring alumina-containing clays, for example, kaolin or halloysite, may be leached by the process of this invention.

It will be understood that the catalyst will typically be in the form of uniformly shaped particles, elongated extrudates or spherical particles. Other shapes may be processed by the method of this invention. The catalyst may be crushed or otherwise processed to change its shape before the application of this invention.

In a buffered system such as the ammonia and ammonium salt leach system, two factors must be adjusted for optimal extraction: the concentration of leaching species and the pH of the leach solutions. The solution must contain sufficient ammonia to complex the nickel and cobalt present, and sufficient ammonium to control pH. The pH should be not lower than 9.5, or molybdenum and vanadium recoveries suffer, and not higher than 11, or nickel and cobalt recoveries suffer. A concentration of ammonia $NH_3$(aq), hereinafter ammonia, plus $NH_4^+$(aq), hereinafter ammonium, not exceeding 6 molar and having the ammonia concentration approximately equal to the ammonium concentration meets these requirements. It is preferred that the solution have at least a six-fold molar ratio of ammonia compared to the amount of cobalt ion plus nickel ion calculated to be on the spent catalyst particles. The molar concentration of the ammonium salt should not exceed about 2 molar, otherwise a vanadium complex precipitates. An especially preferred leach system is one where the ammonia concentration is initially substantially equal to the ammonium ion concentration and both species are present in about 2 molar concentrations.

It has been observed that the length of time of the leach is important for maximum cobalt yield. To maximize cobalt recovery, the catalyst particles should not be in contact with the leach solution for more than fifteen minutes and preferably not longer than ten minutes. The temperature of the leach is also important. In general, the higher the temperature, the more any particular species will go into solution; but a practical upper limit is the boiling point of the solution at atmospheric pressure, above which a pressure vessel would be required. In practice, a temperature of between about 85° C. and 95° C. is found to be optimal. After 15 minutes at about 85° C., the leach solution will typically contain more than 85 percent of the molybdenum, about 75 percent to 80 percent of the nickel, 75 percent to 85 percent of the vanadium, and at least 45 percent of the cobalt. (These percentages refer to the amount by weight of metal in solution compared to the amount of metal that was on the spent catalyst before leaching.) Less than 0.1 percent of the alumina is extracted and less than 5 percent of the iron is extracted.

The once-leached catalyst particles are then removed from the first pregnant liquor and contacted with a second aqueous solution of sulfur dioxide made by either bubbling $SO_2$ directly into the leach tank or by separately making an aqueous solution of $SO_2$ and passing this premade solution into the leach tank. Since it is preferred to leach as much metal as possible with as little solution as possible, it is preferred that the second solution be as nearly saturated in $SO_2$ as possible. It is preferred that the temperature of the leach solution be from 65° C. to 100° C., preferably between 80° C. and 100° C.

The twice-leached catalyst is then removed from the second pregnant liquor and the metals dissolved therein are precipitated by addition of hydrogen sulfide to the solution. It has been observed that the typical metals precipitated are nickel, about 5 percent; molybdenum, about 2 percent; and cobalt, about 35 percent; where percent refers to the amount present on the unroasted catalyst. The precipitated metal sulfides are removed from the second pregnant liquor and mixed with unroasted spent catalyst. The mix is roasted and leached with ammonia. The temperature of the second pregnant liquor is preferably between 10° C. and 30° C. A concentration of about 0.1 molar $H_2S$ in the second pregnant liquor will precipitate the metals of interest rapidly.

The alumina support of the catalyst tends to be leached into the second aqueous solution. Typical amounts can be as high as 10 percent of the total alumina. Since neither alumina nor iron is precipitated by hydrogen sulfide, this invention provides an easy separation of the valuable catalytic metals from the less valuable support and contaminant metals.

DETAILED DESCRIPTION OF THE DRAWING

FIG. 1 shows an embodiment of this invention. Spent catalyst is roasted at 400° C. to 600° C. The roasted catalyst is then contacted with an aqueous solution containing both ammonia and an ammonium salt. The temperature of this leach is maintained at about 90° C. The pregnant liquor is further processed, as shown in FIG. 1. The once-leached catalyst is contacted with a saturated solution of sulfur dioxide at between 65° C. to 100° C. and preferably between 80° C. and 100° C. The aqueous solution of sulfur dioxide and leached metals is removed from the twice-leached catalysts which are disposed of. The aqueous sulfur dioxide solution is contacted with hydrogen sulfide, precipitating metal values from the solution. The metal values precipitated are primarily cobalt and molybdenum. The precipitated sulfides are placed back into the roast to be reroasted and releached with the ammoniacal solution. In this manner, substantially all of the cobalt is recovered and an ammoniacal stream is provided for further processing.

FIG. 2 illustrates the use of this invention as the leach in a process flow scheme for recovering metals from spent catalysts known to contain cobalt, nickel, molybdenum and vanadium. The catalyst is first roasted under conditions where the temperature is controlled to less than 600° C. The spent roasted catalyst is then leached at 90° C. until cobalt values in solution start to decrease. The pregnant liquor is then extracted with a quaternary amine, forming a first set of two streams: an organic stream containing molybdenum and vanadium, and an aqueous stream containing cobalt and nickel. The first organic stream is stripped with an aqueous solution of ammonium bicarbonate. Hydrochloric acid is added to the aqueous strip solution and ammonium metavanadate is precipitated. The volume of the solution is then reduced and ammonium molybdate is precipitated.

Excess ammonia is removed from the first aqueous stream, by heating the solution. The solution, which is exposed to air insuring that cobalt is in the trivalent oxidation state, is extracted with LIX ®64N, removing the nickel and creating a second set of two streams: an aqueous stream containing cobalt and any impurities, and an organic stream containing nickel. The second organic solution is stripped with sulfuric acid, forming an acidic nickel-containing sulfate solution. The cobalt in the second aqueous stream is reduced over cobalt shot, and extracted with LIX ®51, thereby forming a third set of aqueous and organic streams.

The third aqueous stream is recycled to the leach step, enriched in ammonia removed from the ammonia distillation step. The third organic stream is stripped with solution of a solution of ammonia and ammonium carbonate.

By the use of the flow scheme in FIG. 1, a process is provided that is entirely compatible with an ammoniacal leach. Therefore, the pregnant liquor from the leach should be in aqueous ammoniacal solution.

What is claimed is:

1. A process to extract cobalt from spent hydroprocessing catalyst particles comprising:
    (a) roasting said catalyst particles in the atmosphere containing oxygen at a temperature in the range of between 400° C. and 600° C.;
    (b) contacting said roasted catalyst particles with a first aqueous solution of ammonia and a compound selected from the group of ammonium-containing salts consisting of ammonium carbonate and ammonium sulfate, maintained at a temperature in the range of 85° C. to 95° C., in the presence of an oxygen-containing gas;
    (c) separating said catalyst particles from said first aqueous solution containing cobalt values;
    (d) contacting said catalyst particles with a second aqueous solution of sulfur dioxide;
    (e) separating said catalyst particles from said second solution;
    (f) precipitating metals present in said second solution with hydrogen sulfide as metal sulfide; and
    (g) roasting said precipitated metal sulfides with fresh spent catalyst in step (a).

2. The process of claim 1 wherein said spent hydroprocessing catalysts are supported on alumina.

3. The process of claim 1 wherein said first aqueous solution has a pH maintained in the range of 9.5 to 11 and concentrations of ammonia plus ammonium do not exceed 6 molar.

4. The process of claim 1 wherein the catalyst particles are in contact with said first aqueous solution for no more than 15 minutes.

5. The process of claim 1 wherein the pH of said second solution is maintained at between 2.5 and 3.

6. The process of claim 1 wherein the temperature of said second solution during said precipitation step is about 20° C.

* * * * *